US008256994B2

(12) United States Patent
Van Der Zon et al.

(10) Patent No.: US 8,256,994 B2
(45) Date of Patent: Sep. 4, 2012

(54) BIOSEALING

(75) Inventors: Wilhelmus Hendrikus Van Der Zon, Den Haag (NL); Davina Anne Den Hamer, Delft (NL); Johny Willem Marie Lambert, Voorschoten (NL); Waldo Olaf Molendijk, Teteringen (NL)

(73) Assignee: Stichting Deltares, Delft (NL)

( * ) Notice: Subject to any disclaimer, the term of this patent is extended or adjusted under 35 U.S.C. 154(b) by 566 days.

(21) Appl. No.: 12/299,876

(22) PCT Filed: Apr. 2, 2007

(86) PCT No.: PCT/NL2007/050135
§ 371 (c)(1),
(2), (4) Date: Aug. 25, 2009

(87) PCT Pub. No.: WO2007/129889
PCT Pub. Date: Nov. 15, 2007

(65) Prior Publication Data
US 2009/0324344 A1    Dec. 31, 2009

(30) Foreign Application Priority Data
May 9, 2006   (EP) ..................................... 06076026

(51) Int. Cl.
*C09K 17/14* (2006.01)
(52) U.S. Cl. ......... 405/264; 405/270; 405/267; 166/246
(58) Field of Classification Search .................. 405/263, 405/264, 266, 267, 268, 270; 166/246
See application file for complete search history.

(56) References Cited

U.S. PATENT DOCUMENTS

| | | | | |
|---|---|---|---|---|
| 3,105,014 A * | 9/1963 | Harrison | ........................ | 166/246 |
| 3,332,487 A * | 7/1967 | Jones | ............................ | 166/246 |
| 4,475,590 A * | 10/1984 | Brown | ......................... | 166/246 |
| 4,906,575 A | 3/1990 | Silver et al. | | |
| 4,947,932 A * | 8/1990 | Silver et al. | .................... | 166/246 |
| 5,143,155 A * | 9/1992 | Ferris et al. | ................... | 166/246 |
| 5,163,510 A * | 11/1992 | Sunde | .......................... | 166/246 |
| 6,084,150 A * | 7/2000 | Crawford et al. | ............. | 405/263 |
| 6,344,355 B1 * | 2/2002 | Hince et al. | .................... | 405/263 |
| 6,758,270 B1 * | 7/2004 | Sunde et al. | ................... | 166/246 |
| 6,802,805 B2 * | 10/2004 | Akae et al. | ..................... | 405/270 |
| 7,124,817 B1 * | 10/2006 | Sunde | .......................... | 166/246 |
| 2008/0210629 A1 * | 9/2008 | Mankiewicz | ................. | 210/610 |

FOREIGN PATENT DOCUMENTS

| | | |
|---|---|---|
| FR | 2873725 | 2/2006 |
| GB | 2222420 | 3/1990 |
| NL | 1022510 | 7/2003 |

* cited by examiner

*Primary Examiner* — Frederick L Lagman
(74) *Attorney, Agent, or Firm* — Hoffmann & Baron, LLP

(57) ABSTRACT

The invention relates to a method to repair a leak in a geological structure or a construction comprising a geological material, comprising administering a liquid nutrient composition, comprising an energy source for anaerobic bacteria and a multivalent metal ion upstream of the leak allowing micro-organisms present in the structure or construction to ferment the energy source and to grow, thereby increasing biomass in and/or around the leak releasing mineral particles upstream of the leak allowing the mineral particles to migrate to the leak; and allowing the mineral particles to settle in the biomass.

17 Claims, 2 Drawing Sheets

BIOSEALING

This application is the U.S. National Phase of, and Applicants claim priority from, International Application Number PCT/NL2007/050135 filed Apr. 2, 2007 and European Patent Application No. 06076026.1 filed May 9, 2006 which are incorporated herein by reference.

BACKGROUND OF THE INVENTION

The invention relates to a method for repairing a leak in a sub-soil construction and/or a geological structure or a construction comprising a geological material. The invention further relates to the use of a liquid nutrient composition.

The Dutch patent 1 022 510 describes a method for closing a leak in a subterranean construction by applying a nutrient for bacteria such that the leak is closed by bacterial growth. Optionally salt and hydroxide solutions may be applied to be precipitated in or near the leak. It has been found difficult to control such method.

In GB-A 2 222 420, bacteria are used to enhance oil recovery from an oil producing reservoir. Spores of specific bacteria need to be introduced into the oil producing reservoir. It is disclosed to use bacteria to repair a leak in geological structure or a construction comprising a geological material.

In the method of GB-A 2 222 420 permeability around the oil reservoir is altered by growth of biomass and formation of exopolymers. It is not disclosed in GB-A 2 222 420 to release mineral particles upstream of a leak, to allow the particles to migrate to the leak and to allow the mineral particles to settle in biomass formed by the bacteria. The present inventors have concluded that biomass and exopolymers are only effective for a relatively short-time span, as the polymers are biodegradable and/or the micro-organism may whither once administration of nutrients is stopped.

It is an object of the present invention to provide a novel method for repairing a leak in a geological structure, a sub-soil construction and/or a construction comprising a geological material.

In particular it is an object to provide such method, wherein the water permeability in the structure is decreased.

One or more other objects which may be solved in accordance with the invention are apparent from the present description and/or claims

SUMMARY OF THE INVENTION

It has now been found possible to repair a leak in a geological structure or construction comprising a geological material by a combination of specific measures, wherein use is made of micro-organisms and mineral particles.

Accordingly, the present invention relates to a method to repair a leak in a geological structure or a construction comprising a geological material.

administering a liquid nutrient composition, comprising an energy source for anaerobic bacteria and administering a liquid comprising a multivalent metal ion, which liquid may be the nutrient composition, upstream of the leak;

allowing micro-organisms present in the structure or construction to ferment the carbohydrate and to grow, thereby increasing biomass in and/or around the leak;

releasing mineral particles upstream of the leak;

allowing the mineral particles to migrate to the leak; and allowing the mineral particles to settle in the biomass.

Although not necessary, it is preferred for practical reasons that the multivalent metal ion is present in the nutrient composition. If it is administered as a separate liquid it is preferably administered simultaneously with the nutrient composition or thereafter.

DETAILED DESCRIPTION OF THE INVENTION

Figure 1:
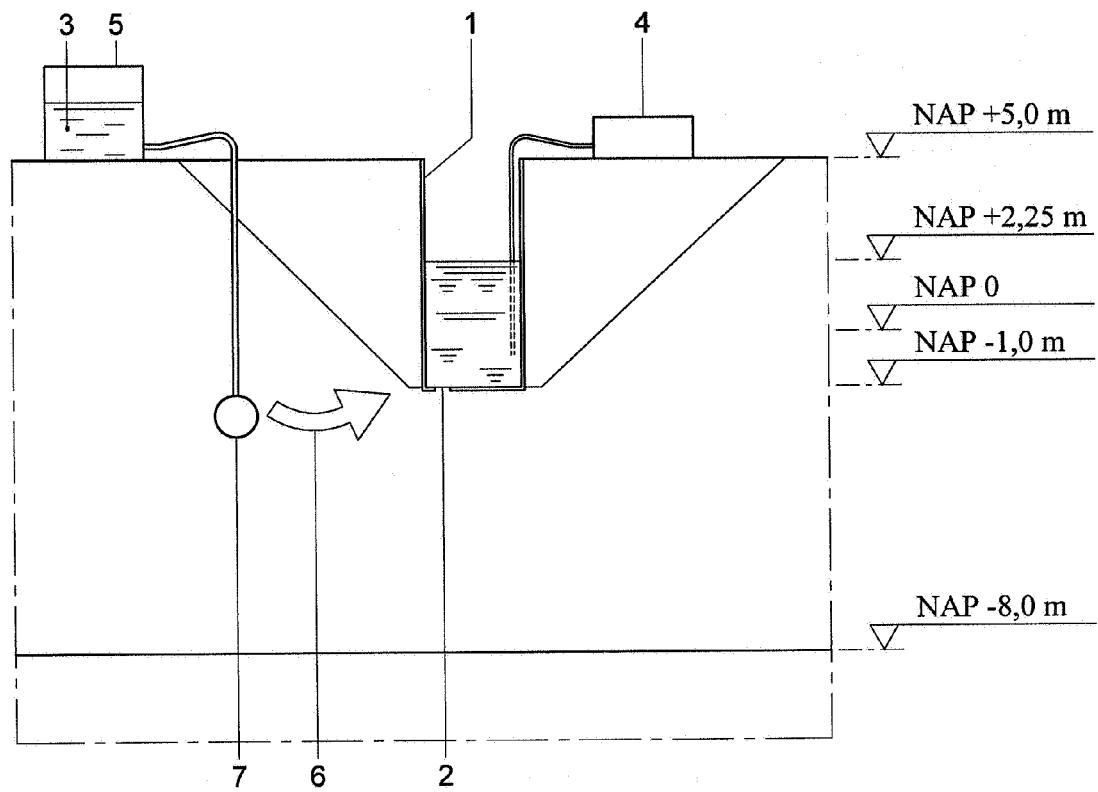
FIG. 1 schematically shows the set-up used in a test to demonstrate the working of a method of the invention.

The nutrient composition usually comprises at least an organic energy source, preferably at least one energy source selected from carbohydrates (in particular a sugar, such as glucose or sucrose, a polysaccharide such as starch, which may be (partially) degraded), amino acids and peptides (in particular polypeptides such as a protein). More preferably at least part of the organic energy source is a sugar.

For a favourable growth of the biomass, the nutrient composition usually also comprises one or more nutritional anions. Nutritional anions are in particular anions that can be converted by the bacteria or otherwise be used to grow. Preferred examples thereof are inorganic anions such as nitrate (used by denitrifying bacteria) and phosphate. Such ions may in particular be used in a total concentration of at least 0.1 g/l, more in particular 0.2-8 g/l.

A position "upstream" (of the leak) is generally used to indicate a position from which a liquid can flow towards the leak. In particular, it relates to the flow direction of ground water.

A "leak" is defined herein as a section within the structure wherein the water permeability is increased compared to the surrounding area. In particular, the permeability may be more than 100 times higher or even more than 1000 times higher.

"To repair a leak" generally means to reduce the flow of water through a section (a leak) wherein the water permeability is increased due to a natural or non-natural cause. In particular it includes reducing seepage.

In accordance with the invention, it has been found possible to reduce the water permeability in (a defined area of) the structure or construction (wherein a leak is present) by a factor 2 or more. Preferably, the permeability is reduced by a factor 10 or more, in particular by a factor of 30 or more. Reduction by a factor of up to 50 or even more are feasible. It is noted that even if the leak is not completely closed, a repair leading to any of the above mentioned reductions is generally beneficial, because it leads to a considerable reduction in the flow through the leak, and thereby to a considerable reduction in the amount of liquid that needs to be drained downstream of the leak, in order to avoid an overflow or flooding downstream of the leak. Such reduction may also be effective to reduce a flow of possibly contaminated groundwater.

The invention further offers an advantage, in that the nutrient composition and/or other compositions may be administered at a relatively long distance from the leak, e.g. from a relative long distance of about 10 m or even more. Of course, such composition(s) may be administered closer to the leak.

It has further been found that the invention is suitable to reduce the permeability for a prolonged period. Thus, the invention is in particular suitable for a sustainable repair. A reduction in permeability may last for over a year. It is envisaged that the invention enables the partial or whole clogging of a leak for a period of a decade or more, 25 years or more, 50 years or more, or even 80 years or more. It is contemplated that in particular the introduction of the mineral particles in the leak largely contribute to a sustainable repair, as these may remain effective, also after the biomass, in particular exopolymers therein, has degraded at least to a substantial degree.

Accordingly, the invention further relates to the use of a liquid nutrient composition as defined herein for reducing water permeability of a geological structure or a construction comprising a geological material.

The invention further relates to the use of a liquid comprising a multivalent metal ion as defined herein to immobilise mineral particles in a geological structure or a construction comprising a geological material. The multivalent metal ions are considered particularly important with respect to achieving a sustainable repair, rather than a short-term repair.

In addition, the invention relates to the use of a composition comprising a salt of a monovalent cation, such as defined herein, to mobilise mineral particles in a geological structure or a construction comprising a geological material.

It is an advantage of the invention that a leak can be partially or fully clogged by a material essentially consisting of components that are natural to the geological material, namely by eroded minerals such as feldspar, mica or clays captured in biomass formed of micro-organisms naturally present in the structure or construction and mineral coagulates, formed in situ.

The term geological structure preferably is a (subterranean) layer comprising gravel, sand, clay and/or silt or a peat layer and/or fractured or jointed rock.

Constructions that may suitably be treated in accordance with the invention are in particular constructions comprising a geological material such as sand, silt, clay, peat or a combination thereof. The invention is in particular suitable to reduce seepage in or underneath a dam or dyke, in or near a tunnel, subterranean space (such as a subterranean parking or basement), a sheet pile or diaphragm wall, a geomembrane construction, an aqueduct or a sewer. A construction comprising concrete and/or cement may also be treated in accordance with the invention. The invention is also useful for the treatment of natural connection between different aquifers, artesian wells and piping.

It is an advantage of the invention that is can be used for treating structures/constructions comprising acidic, neutral and/or alkaline materials.

Before administering the liquid nutrient composition, usually a hydrological influence area is defined, wherein the permeability is to be reduced/the leak to be repaired. The hydrological area may be determined in a manner known in the art, e.g by the Texplor technique of Texplore-Benelux (Papendrecht, the Netherlands; see e.g the brochure: *Geofysische Lekdetectie ECR®/EFT® met multisensorentechnologie*, or the website www.texplore-benelux.nl/).

The invention may usually be employed without adding bacteria to the structure/construction, as these are usually naturally present therein. If desired, bacteria may be administered, in particular bacteria capable of fermenting the energy source. Preferred bacteria include *Clostridium, Bacteriodes, Eubacterium, Pepto(strepto)coccus* and *Lactobacillus*.

It is contemplated that the mechanism underlying the invention involves a combination of biological, physical and geochemical steps.

The nutrient composition has been found an important factor in reducing the water permeability. Without being bound by theory it is contemplated that as a result of the fermenting of the energy source in the structure/construction, acid is formed which in turn contributes to eroding minerals particles present in the geological material. Especially clay minerals can very efficiently be eroded. During fermenting of an energy source such as a carbohydrate, an amino acid or a (polypeptide usually one or more organic acids are formed (such as acetic acid) and bacteria will grow. The organic acid may in turn be digested by (other) bacteria, which are also allowed to grow. Thus, a biomass/bio-slime is formed, in particular in and/or near the leak, as at this section the flow of the nutrient composition is relatively high. The in situ formed eroded particles are allowed to migrate in the direction of the leak, where they are caught in the biomass. It is contemplated that the mineral particles precipitate/flocculate/coagulate as the fermenting has proceeded sufficiently, in particular as it is (almost) completed. As the energy source becomes depleted the pH may rise again. It has further been found that the presence of multivalent ions (such as iron(II) iron(III), calcium ions and/or magnesium ions) is advantageous to reduce the permeability.

It is thought that the ions attach to the surface of the particles after the pH has risen, reducing the electric double layer thereof and aiding precipitation/flocculation/coagulation of the particles.

It has further been found that the presence of metal ions (Calcium, iron, magnesium) is important to create a sustainable (prolonged) reduction in permeability, compared to a comparable method wherein no use is made of the multivalent metal ions.

The nutrient composition and the liquid comprising the multivalent metal ion (which is preferably the same composition) is preferably an aqueous composition. Preferably tap water or ground water is used as the liquid carrier.

The water concentration is preferably 95 to 99.8 wt. % of the total composition.

The concentration of the energy source, in particular a carbohydrate (mixture), is usually in the range of 0.02 wt. % to 5 wt %, in particular in the range of 0.2-5 wt. %. In particular, for use in salt or brackish water aquifers it is preferably at least 1.0 wt. %. In particular, for (fresh) groundwater aquifers it is preferably 0.5 wt. % or less. The concentration may be fine-tuned, depending upon the geological material in the construction or structure. For a relatively fine material, a relatively low concentration may be preferred and for a relatively coarse material a relatively high concentration. Thus, the concentration may be chosen to be up to 1.0 wt. %, up to 0.5 wt. % or up to 0.25 wt. % of the concentration may be chosen to be at least 1.0 wt. % or at least 2 wt. %.

The concentration of the multivalent metal ions (in the nutrient composition and/or in a separate liquid) is usually in the range of 0.1 to 5 gram/litre. For use in salt or brackish water aquifers it is preferably at least 2 gram/litre. For use in fresh water aquifers it is preferably 1.5 gram/litre or less. Preferred metal ions include Ca, Mg and Fe ions, including combinations thereof. The counter ion may be any ion that leads to a sufficiently soluble salt, in particular it may be selected from halogens, especially chloride, and sulphate. Sulphates are advantageous in that they may be used by sulphate reducing bacteria, under formation of sulphide, which may precipitate at or near the leak with the metal ions.

Preferably an organic acid is present as a secondary energy source, in addition to a primary energy source such as a carbohydrate, an amino acid and/or a (poly)peptide. Preferred organic acids include acetate, proprionate, formiate and butyrate. These may act as a energy source for certain bacteria, in particular for bacteria capable of reducing sulphate. The organic acid concentration is preferably in the range of 0.1 g/l to 2 g/l, more preferably in the range of 0.5 g/l to 1.5 g/l, in particular about 1 g/l.

It has been found that efficiency (amount of nutrient composition needed to obtain a specific reduction) is improved, in case the density of the nutrient composition and/or the liquid containing the multivalent metal ions and/or the salt solution for releasing mineral particles is about the same as the density of the groundwater within the hydrological influence area. Good results have been achieved with a method wherein the difference between the density of one or more of said liquids is at most ±15% (calculated as [density groundwater−density liquid]/density groundwater), preferably at most ±10%. If desired, the density may be altered by adding an appropriate additive. E.g. a salt may be used to increase the density. Lowering the density may e.g. be achieved by diluting the liquid with water having a lower density than the ground water (usually water having a lower ionic strength than the ground water, e.g. tap water or fresh water, in case the ground water is saline).

Without being bound be theory it is contemplated that a composition with a matching density is taken to the leak more easily or more effectively by the groundwater.

It has further been found advantageous to use a nutrient composition, wherein the viscosity of the nutrient composition at 12° C., as determinable by Haake rotoviscometer test is 10 mPa·s or less, preferably 1 to 5 mPa·s. It is also possible to alter the viscosity by qualitatively and/or qualitatively choosing the energy source and/or the multivalent ions. E.g. for a higher viscosity a polymeric energy source (starch, oligosaccharide) may be included. Multivalent metal ions may also affect viscosity, in particular in combination with polymers. A suitable viscosity and choice of ingredients can routinely be determined based upon common general knowledge and the present description.

The nutrient composition may be administered continuously or intermittently for a sufficient duration to allow sufficient nutrient to be fed to the micro-organisms to allow them to grow.

The nutrient composition may e.g. be administered at least about once a week, preferably at least about four times every week, usually with regular intervals. The administration period is usually at least 2 weeks. Preferably, the administration is carried out intermittently or continuously for a period of 2 to 4 weeks. Good results have been achieved with a method wherein nutrient composition is administered at least about once a day. The amount of liquid nutrients added depends of the treated area. However, as a guideline every administration (injection) is usually at least 25% of the volume of the pore space of the treated soil, preferably at least 50%. Usually a volume of 150% or less is sufficient for good results. Preferably a volume of up to 100% is used per administration.

The release of mineral particles can be facilitated by the presence of cations such as protons (and $H_3O^+$) and/or monovalent cations such as potassium and/or sodium. The protons/$H_3O^+$ are formed in situ as a result of the fermentation of the energy source. The monovalent cations may be present in the nutrient solution or administered separately, as a salt solution. The counter ion may be any ion that result is a salt that is sufficiently soluble. Particularly suitable is chloride. It is contemplated that the monovalent cations adhere to the particles and reduce their surface charge, upon which they become more mobile and can migrate to the leak in the flow of the groundwater, where they will be captured in the biomass and allowed to flocculate/coagulate/precipitate in presence of bivalent ions such as calcium, magnesium, iron or the like. It is further contemplate that the monovalent cations may catalyse the process.

In an advantageous embodiment a salt solution, comprising a salt of a monovalent cation, is administered after an administration of the nutrient composition. If the liquid comprising the multivalent cation is administered separately from the nutrient composition the salt solution, comprising the salt of a monovalent cation is preferably administered after the liquid comprising the multivalent cation (and after allowing the microorganisms to ferment at least part of the energy source, thereby reducing the pH and eroding the geological material, to release mineral particles).

The salt solution preferably has a density that is about the same as the density of the groundwater. The viscosity preferably is 1 to 5 mPa·s.

The concentration of the salt of the monovalent cation in the salt solution is usually chosen in the range of 0.5 to 10 g/l. The concentration of said salt is preferably at least 0.8 g/l, in particular at least about 1.0 g/l. The concentration of said salt is preferably 5 g/l or less, in particular 2 g/l or less.

The salt solution may be administered continuously or intermittently. Preferably, the salt solution is administered intermittently, for instance with intervals in the range of 12-60 hrs, in particular in the range of 24-48 hrs. Preferably, the salt solution is administered after at least a majority of the nutrient composition administrations, in particular after each nutrient composition administration.

In an advantageous embodiment, water is administered to the structure or construction after administration of the nutrient composition, the liquid comprising the multivalent cations and/or after administration of the monovalent cation salt solution (if any is administered). This has been found advantageous with respect to keeping the structure or construction sufficiently permeable upstream of the leak, to allow easy administration of the nutrient composition (and other solution(s)) upstream of the leak.

The invention further relates to a liquid nutrient composition for bacteria, found in a geological material such clay, sand, silt, etc., comprising water an organic energy source, preferably selected from carbohydrates, amino acids, peptides and combinations thereof, in a total concentration of 0.2-5 g/l;

a multivalent metal ion, preferably selected from magnesium ions, calcium ions, iron ions and combinations thereof, in a total concentration of 0.1 to 5 g/l;

a nutritional (inorganic) anion, preferably selected from nitrates, phosphates and combinations thereof, in a total concentration of 0.1 to 8 g/l, in particular 0.2-6 g/l, more in particular 0.3-4 g/l; optionally an organic acid in a concentration of 0.1 to 2 g/l.

Such composition is particular suitable for reducing water permeability of a geological structure or a construction comprising a geological material, in particular in a method of the invention.

The water content (for use in fresh ground water) is usually at least about 940 g/l, preferably at least 960 g/l, more preferably at least 975 g/l. The water content (for use in brackish or salt ground water) is usually at least about 920 g/l, preferably at least 940 g/l, more preferably at least 955 g/l.

Optionally, a salt of a monovalent cation, in particular NaCl may be present, especially in case the ground water in the area to be treated is brackish or salt. The NaCl concentration is preferably about the same as in the ground water to be treated. So, if present, it is usually in the range of about 1 mg/l (low sodium, fresh water) to about 15 g/l (seawater having a high salt content), in particular in the range of about 10 mg/l to about 10 g/l. In particular for fresh water applications, the NaCl is usually less than 1 g/l.

Other preferred features are as defined above, when discussing the method of the invention, The invention will now be illustrated by the following example.

EXAMPLE 1

A 20 ft. sea container was dug into the soil and filled with the sand that was excavated, after 6 holes with a 0.08 m diameter had been punched in the bottom of the container. FIG. 1 schematically shows the set-up. The container 1 with leak 2 is positioned in the soil. Upstream thereof the nutrient composition 3 in storage tank 5 is pumped into the soil. Arrow 6 shows the flow of the ground water via which the nutrient composition injected into the soil (7) flows to the leak. Other liquids (such as water) are administered in a similar way (not shown).

The flow through the leakage was determined to be 7.5-9.7 m$^3$/day, depending upon the groundwater level which varied from +3.73 m NAP to +4.86 NAP, NAP being "Normaal Amsterdams Peil", the Dutch standard for defining altitudes, 0 NAP is (about) sealevel)

The set-up is schematically shown in FIG. 1.

A concentrated nutrient composition comprising 1.5 g/l carbo-hydrates and 500 ppm multivalent cations (based on Nutrolase, available from Avébé, Foxhol, the Netherlands) was diluted with tap water, as indicated in the table below and administered to the container via standpipes, which had been placed about 2.5 m upstream of the leak. The administration regime is shown in the Table below. After every administration, water was administered.

| date | volume nutrient composition [l] | ratio nutrient concentrate - water | depth pipe [m NAP] |
|---|---|---|---|
| 2 Mar. 2004 | 30 | 1:5 | −0.47 |
|  |  |  | −1.14 |
|  |  |  | −1.80 |
| 11 Mar. 2004 | 30 | 1:50 | −0.47 |
|  |  |  | −1.14 |
| 22 Mar. 2004 | 6 | 1:40 | −0.47 |
| 23 Mar. 2004 | 6 | 1:40 | −1.14 |
| 24 Mar. 2004 | 6 | 1:40 | −1.80 |
| 25 Mar. 2004 | 6 | 1:40 | −0.47 |
| 26 Mar. 2004 | 15 | 1:40 | −1.14 |
| 29 Mar. 2004 | 15 | 1:40 | −0.47 |
| 30 Mar. 2004 | 15 | 1:40 | −1.14 |
| 31 Mar. 2004 | 15 | 1:40 | −1.80 |
| 1 Apr. 2004 | 15 | 1:40 | −0.47 |
| 2 Apr. 2004 | 15 | 1:40 | −1.14 |
| 13 Apr. 2004 | 15 | 1:40 | −0.47 |
| 14 Apr. 2004 | 15 | 1:40 | −1.14 |
| 15 Apr. 2004 | 15 | 1:40 | −1.80 |
| 16 Apr. 2004 | 15 | 1:40 | −1.14 |
| 19 Apr. 2004 | 15 | 1:40 | −0.47 |
| 20 Apr. 2004 | 15 | 1:40 | −1.14 |
| 21 Apr. 2004 | 15 | 1:40 | −1.80 |
| 22 Apr. 2004 | 15 | 1:40 | −0.47 |

It was concluded that the viscosity of the 1:5 diluted concentrate was about twice as high as the viscosity of the ground water and that this was disadvantageous with respect to delivering nutrient solution to microorganisms in or near the leak. The other dilutions matched the viscosity of ground water closer (about 1% lower viscosity) and allowed better delivery.

The density of the 1:40 dilution and 1:50 dilution closely matched the density of the groundwater, which was also found advantageous with respect to a relatively homogenous mixing of the nutrient with the ground water flow.

The flow through the leaks was determined daily and the clogging degree (reduction factor of the permeability) by dividing the initial permeability by the permeability at that day. The groundwater flow outside the container was also monitored, to allow compensation for fluctuations in the daily ground water flow. Taking these fluctuations into account, the permeability was reduced by a factor 5 after 45 days, from the first administration of nutrient composition and by a factor 30 after 69 days, from the first administration of nutrient composition.

Further, a decrease in pH and the occurrence of organic acids was observed from 2 Apr. 2004, indicating that the microorganisms naturally present in the material were effective in fermenting the nutrient composition.

To a different container, also comprising the leaks no nutrient composition was administered. The permeability was monitored for 2 months. No clogging of any significance was observed.

EXAMPLE 2

A leak was detected in an aqueduct made in a wet soil (peat) of a polder. The aqueduct had been made with underwater concrete. Underneath the concrete floor a layer of coarse gravel and crushed rocks had been deposited. It was found that brackish groundwater seeped upward from the Pleistocene water bearing layer. The leakage leads to local flooding at the surface. Further the polder was subject to becoming brackish.

Several leaks were detected by ECR and EFT measurements (using a Texplor technique). One leak was found near the compartment screen of the aqueduct. Further a number of leaks were detected in the base peat layer, forming part of the geological structure near the aqueduct. Also a seepage water flow was detected near the dam walls.

15 injections of 200 l of a nutrition composition (a 1:40 v/v Nutrolase/water mixture supplemented with nitrates, phosphates (both in a concentration of about 2 gram/liter), calcium and iron ions (both in a concentration of about 1 gram/liter) were administered over a 3-week time span (every working day), 1 to 2 days upstream of the approximate location of the leak near the compartment screen. After every injection of nutrient composition, 200 l of water were injected.

Figure 2:
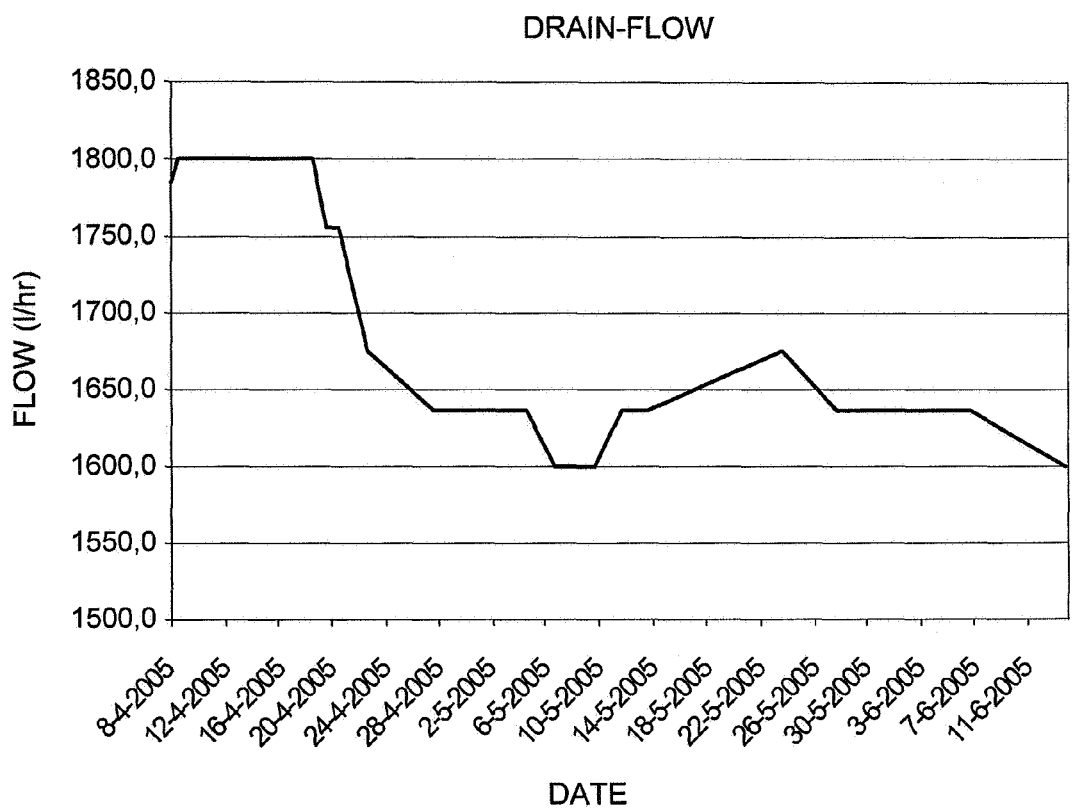
FIG. 2 shows the reduction in water flow through a leak at an aqueduct, realised by employing a method of the invention.

FIG. 2 shows the flow through the leaks, starting four days after the first injection. It is shown that within a month from the first injection, the flow is reduced by over 10%.

It was concluded that the leak near the compartment screen and one of the leaks in the peat layer was closed. Remainder of the flow was caused by a flow of seepage water near the dam walls, possibly in combination with perforations in the base peat layer.

The invention claimed is:

1. Method to repair a leak in a geological structure or a construction comprising a geological material, comprising
administering a liquid nutrient composition comprising an energy source for anaerobic bacteria and administering a liquid comprising a multivalent metal ion, which may be the same as the liquid nutrient composition, upstream of the leak, wherein the liquid nutrient composition and the liquid comprising the multivalent metal ion flow towards the leak with ground water flow,
allowing micro-organisms present in the structure or construction to ferment the energy source and to grow, thereby increasing biomass in and/or around the leak
releasing mineral particles upstream of the leak
allowing the mineral particles to migrate to the leak; and
allowing the mineral particles to settle in the biomass.

2. Method according to claim 1, wherein the nutrient composition comprises an organic energy source and a nutritional anion, wherein the anion is preferably an nutritional inorganic anion, more preferably selected from the group consisting of nitrates, phosphates and combinations thereof.

3. Method according to claim 1, wherein the mineral particles are released in situ by administering a salt solution, comprising a monovalent cation, in an effective amount to release the mineral particles from the geological material.

4. Method according to claim 3, wherein the salt solution comprises at least one monovalent cation selected from sodium ions and potassium ions.

5. Method according to claim 3, wherein the concentration of the salt of the monovalent cation is in the range of 0.5 to 10 g/l, preferably 0.8 to 5 g/l.

6. Method according to claim 1, wherein the density of the nutrient composition, the liquid comprising the multivalent metal ion and/or the salt solution for releasing mineral particles is about the same as the density of the groundwater within the hydrological influence area.

7. Method according to claim 1, wherein the energy source content of the nutrient composition is 0.02 to 5 wt. %, in particular 0.2-5 wt. %.

8. Method according to claim 1, wherein the multivalent metal ion concentration of liquid comprising the multivalent metal ion is 0.1 g/l to 5 g/l.

9. Method according to claim 1, wherein the multivalent metal ion is selected from the group consisting of calcium ions, magnesium ions and iron ions.

10. Method according to claim 1, wherein the nutrient composition comprises at least one organic nutrient component selected from carbohydrates (in particular glucose, glucose containing sugars, glucose containing oligosaccharides and glucose containing polysaccharides) amino acids, (poly) peptides (in particular proteins) and organic acids.

11. Method according to claim 1, wherein the viscosity at 12° C. of the nutrient composition, the liquid comprising the multivalent metal ion and/or the salt solution comprising the monovalent cation is 10 mPa·s or less.

12. Method according to claim 1 wherein the geological structure or the construction comprises at least one component selected from the group consisting of gravel, clay, sand, silt, peat and fractured or jointed rock formations.

13. Method according to claim 1 wherein the structure or construction is selected from the group consisting of dams, dykes, tunnels, subterranean parking's, basements, sheet pile walls, diaphragm walls, remembrance, constructions, sewers and (natural connections between different) aquifers.

14. Liquid nutrient composition for bacteria in a geological material, comprising
    water
    at least one organic energy source selected from carbohydrates, amino acids and peptides in a total concentration of 0.2-50 g/l;
    at least one multivalent metal ion selected from magnesium ions, calcium ions and iron ions in a total concentration of 0.1 to 5 g/l;
    at least one nutritional anion, preferably selected from nitrates and phosphates, in a total concentration of 0.1 to 8 g/l; and
    at least one organic acid in a concentration of 0.1 to 2 g/l.

15. Use of a liquid nutrient composition as defined in claim 14 for reducing water permeability of a geological structure or a construction comprising a geological material.

16. Use of a composition comprising a salt of a monovalent cation, such as defined in claim 14 to mobilise mineral particles in a geological structure or a construction comprising a geological material.

17. Use of a liquid comprising a multivalent metal ion, such as defined in claim 14 to immobilise mineral particles in a geological structure or a construction comprising a geological material.

* * * * *

UNITED STATES PATENT AND TRADEMARK OFFICE
CERTIFICATE OF CORRECTION

| | | |
|---|---|---|
| PATENT NO. | : 8,256,994 B2 | |
| APPLICATION NO. | : 12/299876 | |
| DATED | : September 4, 2012 | |
| INVENTOR(S) | : Van Der Zon et al. | |

It is certified that error appears in the above-identified patent and that said Letters Patent is hereby corrected as shown below:

Column 4, line 2:
Now reads: "(polypeptide usually"
Should read: -- (poly)peptide usually --

Column 5, line 22:
Now reads: "is 10 mPa·s or less, preferably 1 to 5 mPa·s."
Should read: -- is 10 mPa.s or less, preferably 1 to 5 mPa.s. --

Column 6, line 11:
Now reads: "5 mPa·s"
Should read: -- 5 mPa.s --

Column 10, line 2:
Now reads: "10 mPa·s"
Should read: -- 10 mPa.s --

Signed and Sealed this
Eighth Day of January, 2013

David J. Kappos
*Director of the United States Patent and Trademark Office*